United States Patent
Houk et al.

(10) Patent No.: US 11,131,740 B2
(45) Date of Patent: Sep. 28, 2021

(54) SYSTEM AND METHOD FOR ALIGNING A SENSOR ASSEMBLY

(71) Applicant: Ford Motor Company, Dearborn, MI (US)

(72) Inventors: Peter Houk, Ann Arbor, MI (US); Matthew Miller, Royal Oak, MI (US)

(73) Assignee: Ford Motor Company, Dearborn, MI (US)

( * ) Notice: Subject to any disclaimer, the term of this patent is extended or adjusted under 35 U.S.C. 154(b) by 455 days.

(21) Appl. No.: 15/817,331

(22) Filed: Nov. 20, 2017

(65) Prior Publication Data

US 2019/0154787 A1 May 23, 2019

(51) Int. Cl.
*G01S 1/02* (2010.01)
*G01B 21/24* (2006.01)

(52) U.S. Cl.
CPC .............. *G01S 1/022* (2013.01); *G01B 21/24* (2013.01)

(58) Field of Classification Search
CPC ................................. G01S 1/022; G01B 21/24
See application file for complete search history.

(56) References Cited

U.S. PATENT DOCUMENTS

| | | | |
|---|---|---|---|
| 6,363,619 | B1 | 4/2002 | Schirmer et al. |
| 6,556,166 | B1 | 4/2003 | Searcy et al. |
| 8,957,807 | B2 | 2/2015 | Mills et al. |
| 10,386,461 | B1* | 8/2019 | Brown ................. G01S 13/878 |
| 2001/0043745 | A1* | 11/2001 | Friederich ........... H03M 7/3084 |
| | | | 382/232 |
| 2010/0182199 | A1* | 7/2010 | Jeong .................... G01S 7/4026 |
| | | | 342/374 |
| 2018/0120133 | A1* | 5/2018 | Blank .................. A01B 63/002 |
| 2019/0369234 | A1* | 12/2019 | Wetoschkin .......... G01S 13/931 |

FOREIGN PATENT DOCUMENTS

| | | | |
|---|---|---|---|
| CN | 103901411 | | 7/2014 |
| DE | 102004026044 | * | 5/2004 .......... G01S 7/4026 |
| JP | 2008268088 | | 11/2008 |
| KR | 20140109716 | | 9/2014 |
| WO | 2011/048831 | | 4/2011 |

OTHER PUBLICATIONS

DSpace GmbH, Closed-Loop HIL Release Tests for Camera and Radar-Based Applications, available at URL: https://www.dspace.com/en/pub/home/applicationfields/our_solutions_for/driver_assistance_systems/hil_simulation/hil_testing_camera_and_radar.cfm.

Schenk, J.et al., New Integrated Inline Concept for Vehicle Testing and Adjusting Within the Automotive Series Production , pp. 73-78, Durr Assembly Products GmbH and RWTH Aachen, IGM, 2006, available at URL https://www.sciencedir ect.com/science/article/pii/5147466670153414 46.

* cited by examiner

*Primary Examiner* — Marc Anthony Armand
(74) *Attorney, Agent, or Firm* — Burris Law, PLLC

(57) ABSTRACT

The present disclosure relates to a system and method of aligning a sensor assembly for a vehicle. The sensor assembly is disposed along a vehicle body and has a sensory face from which a measurement signal is transmitted. The sensor alignment system includes an alignment gauge that measures a datum angle of the sensor assembly, a sensor adjustment tool that adjusts a position of the sensor assembly relative to the vehicle body, and a controller that is in communication with the alignment gauge and the sensor adjustment tool. The controller further operates the sensor adjustment tool to control the datum angle of the sensor assembly to within a tolerance range.

16 Claims, 4 Drawing Sheets

SYSTEM AND METHOD FOR ALIGNING A SENSOR ASSEMBLY

FIELD

The present disclosure relates to a method of aligning a sensor assembly for a vehicle.

BACKGROUND

The statements in this section merely provide background information related to the present disclosure and may not constitute prior art.

Many driver assistance features of new vehicles use forward looking sensor assemblies, such as radars, to detect the environment around the vehicle. For example, a radar assembly detects other vehicles and obstacles on the road. To monitor the road ahead of the vehicle, such radar assemblies are generally aligned within a preset range along the vertical direction.

Some sensor assemblies are adjusted post vehicle assembly at, for example, a work station for other vehicle checks, such as suspension alignment, and are adjusted manually by an operator. The time allocated for aligning the suspension may not be enough for aligning the sensor assembly and therefore, can increase operation time and thus, cost. Furthermore, adding additional offline work stations dedicated for sensor assembly alignment not only results in allocating a separate offline time for such adjustment, but also requires additional space and investment. The present disclosure addresses these and other issues related to aligning the sensor assembly to the vehicle.

SUMMARY

This section provides a general summary of the disclosure, and is not a comprehensive disclosure of its full scope or all of its features.

In one form of the present disclosure, a sensor alignment system for aligning a sensor assembly. The sensor assembly is disposed along a vehicle body and has a sensory face from which a measurement signal is transmitted. The sensor alignment system includes an alignment gauge operable to measure a datum angle of the sensor assembly, and the alignment gauge has a datum surface that contacts the sensory face of the sensor assembly to measure the datum angle. The system includes a sensor adjustment tool operable to adjust a position of the sensor assembly relative to the vehicle body and a controller communicably coupled to the alignment gauge and the sensor adjustment tool. The controller is configured to operate the sensor adjustment tool to control the datum angle of the sensor assembly to within a tolerance range based on the datum angle measured by the alignment gauge and offset information that includes one or more recognized offsets that influence an angular position of the sensor assembly.

In another form, the sensor assembly is a radar assembly and the alignment gauge includes a clamp that is operable to attach to the radar assembly as it measures the datum angle.

In one form, the offset information includes at least one of an environmental offset, a statistical offset, and a sensor assembly offset.

In yet another form, the offset information includes an environmental offset that includes offsets related to at least one of the sensor adjustment tool, the alignment gauge, and a platform upon which the vehicle body is supported.

In one form, the offset information includes a statistical offset that is based on performance data of a plurality of sensor assemblies.

In another form, the offset information includes a sensor assembly offset that is based on manufacturing offsets related to the sensor assembly.

In yet another form, the controller is communicably coupled to the alignment gauge via wireless communication.

In one form of the present disclosure, a method for aligning a sensor assembly disposed along a vehicle body is provided. The method includes measuring, by an alignment gauge, a datum angle of the sensor assembly. The alignment gauge has a datum surface and is attached to the sensor assembly such that the datum surface interfaces with a sensory face of the sensor assembly from which a measurement signal from the sensor assembly is emitted. The method further includes calculating, by a controller, a calibrated datum angle based on the measured datum angle and offset information, and adjusting a position of the sensor assembly with a sensor adjustment tool operable by the controller in response to the calibrated datum angle being outside an angular threshold range. The offset information is stored by the controller and includes one or more recognized offsets that influence an angular position of the sensor assembly.

In another form, the method includes transmitting, by the alignment gauge via wireless communication, the measured datum angle to the controller.

In yet another form, adjusting the position of the sensor assembly further includes transmitting, by the controller, a control signal to the sensor adjustment tool to have the sensor adjustment tool adjust the position of the sensor assembly based on the calibrated datum angle and the angular threshold range, and driving, by the sensor adjustment tool, a fastener that attaches the sensor assembly to the vehicle body in response to receiving the control signal.

In one form, the method includes comparing, by the controller, the calibrated datum angle with the angular threshold range. The method further includes driving, by the sensor adjustment tool, the fastener in a first direction in response to the calibrated datum angle being greater than an upper limit of the angular threshold range; and driving, by the sensor adjustment tool, the fastener in a second direction different from the first direction in response to the calibrated datum angle being less than a lower limit of the angular threshold range.

In another form, the sensor assembly is a radar assembly.

In still another form, the offset information includes at least one of an environmental offset, a statistical offset, and a sensor assembly offset.

In yet another form, the offset information includes an environmental offset that includes offsets related to at least one of the sensor adjustment tool, the alignment gauge, and a platform upon which the vehicle body is supported.

In one form, the offset includes a statistical offset that is based on performance data of a plurality of sensor assemblies.

In another form, the offset information includes a sensor assembly offset that is based on manufacturing offsets related to the sensor assembly.

In one form of the present disclosure, a method for aligning a vehicular radar assembly is provided. The method includes measuring, by an alignment gauge, a datum angle of the radar assembly, transmitting, by the alignment gauge, the datum angle to a controller, and adjusting, with a sensor adjustment tool operable by the controller, a position of the radar assembly based on the measured datum angle and offset information, such that the datum angle is within an angular threshold range.

In another form, the offset information includes at least one of an environmental offset, a statistical offset, and a sensor assembly offset.

In yet another form, the offset information is stored by the controller and includes one or more recognized offsets that influence an angular position of the sensor assembly.

In another form, the method includes calculating, by the controller, a calibrated datum angle based on the measured datum angle and the offset information and determining, by the controller, whether the calibrated datum angle is within the angular threshold range prior to adjusting the position of the radar assembly.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
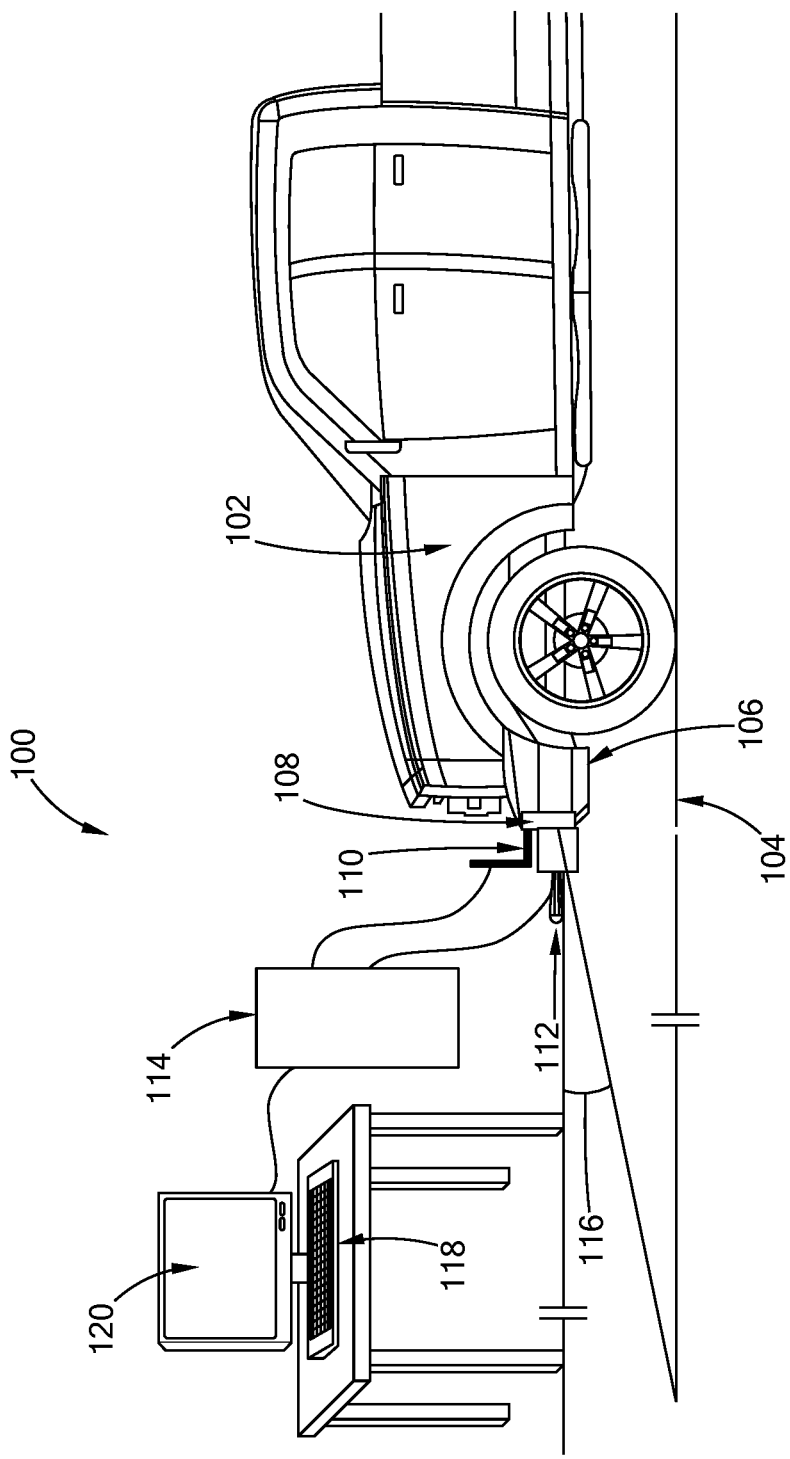
FIG. 1 is a side view illustrating a system for aligning a sensor assembly according to teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure is directed toward a sensor alignment system that aligns a sensor assembly, such as a radar assembly, disposed along a body of a vehicle. As described further herein, in one form, the system includes an alignment gauge to measure a datum angle of the sensor assembly, a controller for determining whether the datum angle is within a set tolerance range, and a sensor adjustment tool that is operable by the controller for adjusting the position of the sensor assembly when the measured datum angle is outside the set range.

In the following, the sensor assembly is provided as a radar assembly disposed along the bumper of the vehicle. It should be readily understood that the sensor assembly can be other suitable sensors and should not be limited to a radar assembly, and that the sensor assembly can be disposed at other locations of the vehicle.

Referring to FIG. 1, a sensor alignment system 100 for aligning a radar assembly 108 according to the present disclosure is provided. Here, the radar assembly 108 is disposed along a bumper 106 of a vehicle body 102 and includes components such as a radar antenna (not shown) and a case 200 (FIG. 2) that houses the radar antenna. In operation, the radar assembly 108 emits radio waves through a sensory face 202 (FIG. 2) and receives reflected radio waves, which are used to detect an object.

The sensor alignment system 100 includes an alignment gauge 112, a sensor adjustment tool 110, and a controller 114. In one form, the controller 114 is communicably coupled to the alignment gauge 112 and the sensor adjustment tool 110 via wired communication or wireless communication (e.g., Wi-Fi, Bluetooth, etc.).

Figure 2:
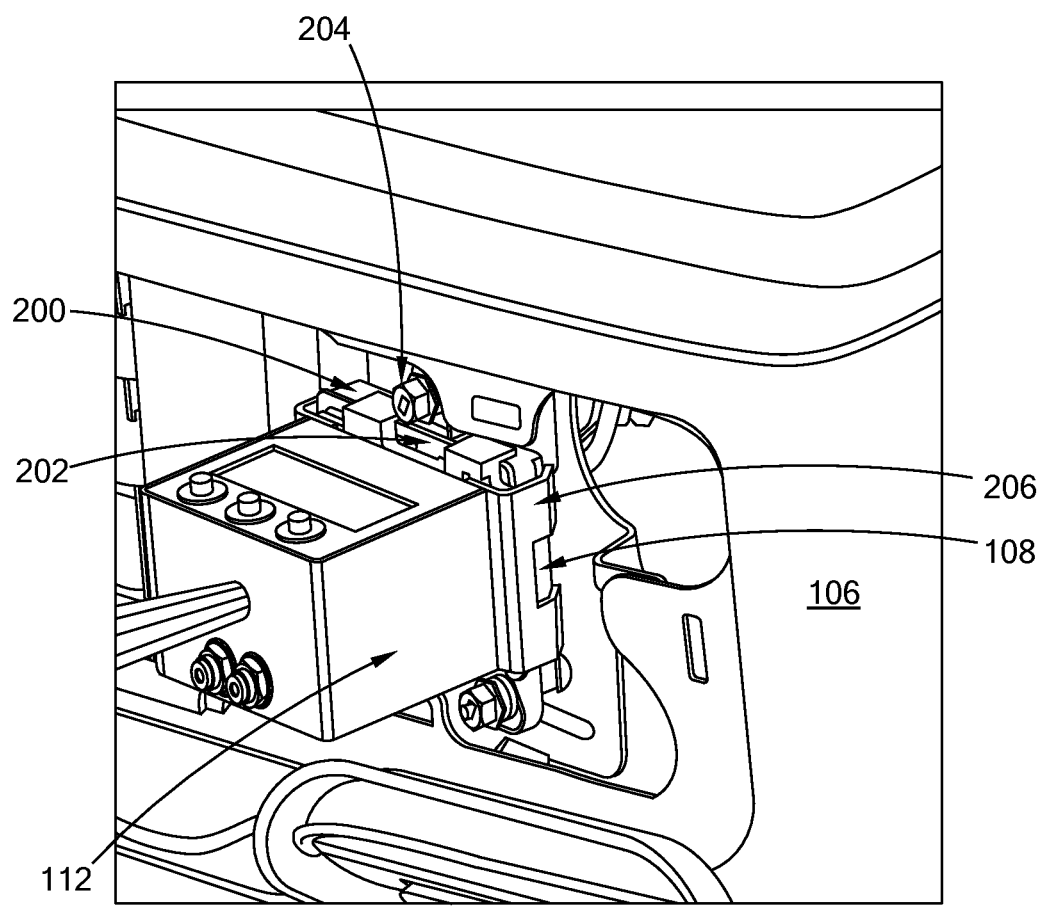
FIG. 2 is a perspective view of the sensor assembly with an alignment gauge of the system interfacing with the sensor assembly according to teachings of the present disclosure.
Figure 3:
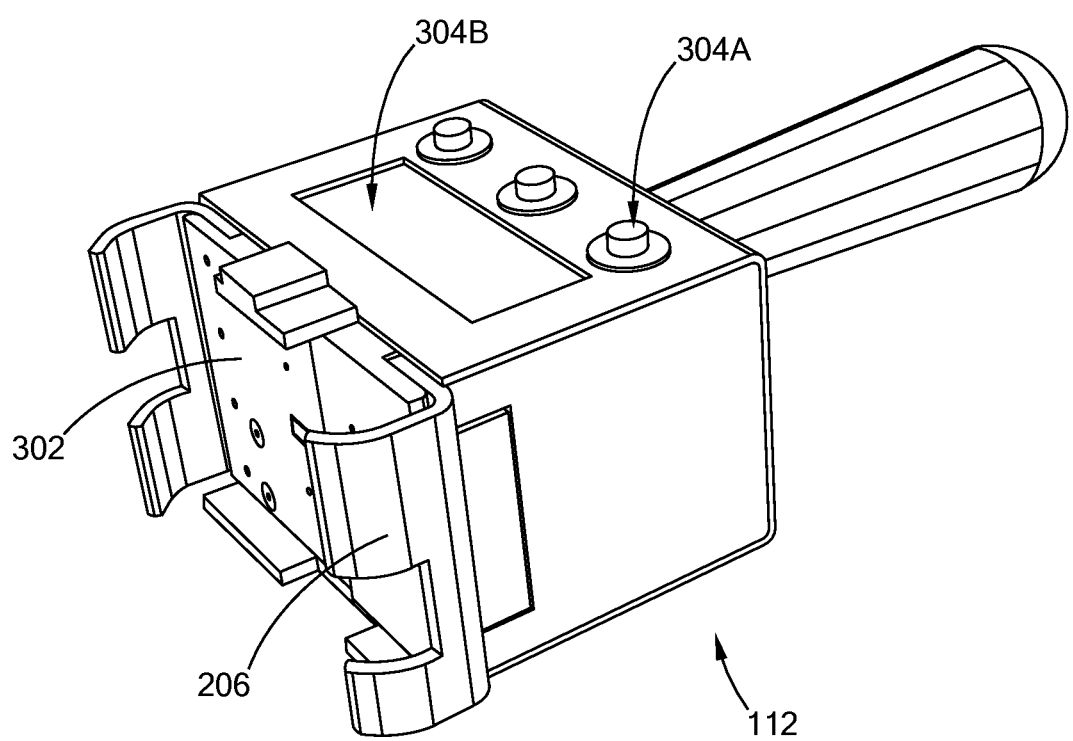
FIG. 3 is a perspective view of the alignment gauge of FIG. 2.

The alignment gauge 112 is a measurement instrument such as an inclinometer, that measures a tilt or, in other words, a datum angle 116 of the radar assembly 108 relative to a ground plane. The alignment gauge 112 transmits the datum angle 116 to the controller 114. Referring to FIGS. 2 and 3, in one form, the alignment gauge 112 includes a clamp 206 that is configured to attach to the radar assembly 108, and a datum surface 302 that interfaces with the sensory face 202 of the radar assembly 108. The alignment gauge 112 further includes a user interface, such as one or more push buttons 304A and a display screen 304B, that are operable by an operator for positioning the alignment gauge 112 on the radar assembly 108. The display screen 304B may display a message that includes the measured datum angle. While the datum angle 116 is described as the angle between the datum surface 302 and the ground plane/platform 104, the angle may be defined in other suitable ways based on the position of the sensor assembly and orientation of the sensory face 202. In addition, the alignment gauge illustrated in the figures is just one example of a measurement tool that measures the tilt of the radar assembly. Other suitable alignment gauges are also within the scope of the present disclosure.

The sensor adjustment tool 110 adjusts a position of the radar assembly 108 based on a control signal from the controller 114. In one form, the sensor adjustment tool 110 is a power tool that is configured to engage with a fastener 204 of the sensor assembly 108. To change the datum angle of the sensor assembly 108, the sensor adjustment tool 110 drives the fastener 204 in, for example, a first direction to increase the datum angle 116 and in a second direction opposite the first direction to decrease the datum angle. For example, in one form, the fastener 204 is a bolt and the sensor adjustment tool 110 is a nut driver that is operable to drive (i.e., rotate) the nut in a clockwise direction to decrease the datum angle and in a counterclockwise direction to increase the datum angle.

The controller 114 may be a computer that includes, for example, a processor, a computer readable medium, and other electronic components. The controller 114 may be local or remote to the system 100 and is operable by the operator by way of a user interface, such a keyboard 118 and a display 120 (FIG. 1). In one form, the controller 114 is configured to align the radar assembly 108 based on the measured datum angle and offset information.

The offset information includes one or more recognized offsets that influence an angular position of the radar/sensor assembly 108. For example, offsets may include, but are not limited to, an environmental offset, statistical offset, and a sensor assembly offset. The environmental offset includes offsets related to the manufacturing environment of the vehicle. For example, the environmental offset includes an incline of the platform 104 upon which the vehicle is standing, and tolerances associated with the sensor adjustment tool 110 and the alignment gauge 112 that may affect the accuracy of the measurement and the adjustment of the sensor assembly. The statistical offset is based on data of previous sensor assemblies that were aligned by the system 100. For example, a database (not shown) may store data, such as a part number of the sensor assembly, make and model of the vehicle on which the sensor assembly is installed, and vehicle check test data that is indicative of the performance of the sensor assembly when it is installed in the vehicle. Using the stored data, a statistical analysis is performed to determine, for example, variation in alignment based on make and model of the vehicles. The sensor assembly offset is variation or offset of the sensor assembly. For example, for a radar assembly, the offset is related to a deviation associated with a position of the antenna within the case 200. In one form, the sensor assembly offset is provided by the manufacturer of the sensor assembly.

The controller 114 stores the offset information in memory. While specific examples offset information is provided, other suitable offset are also within the scope of the present disclosure.

In one form, using the offset information, the controller 114 adjusts the measured datum angle to calculate a calibrated datum angle. For example, for an offset related to the incline of the platform 104, the controller 114 subtracts or adds the offset from the measured datum angle to determine the calibrated datum angle. The controller 114 is configured to calculate the calibrated datum angle in various suitable ways to account for one or more the offsets. If no offset information is stored, the controller 114 is configured to use the measured datum angle as the calibrated datum angle for determining whether the datum angle is within a set tolerance range.

Using the calibrated datum angle, controller 114 determines whether the datum angle is within a set angular range or in other words, a set tolerance range. For example, the set angular range includes, but is not limited to, +/−3.0 degrees or +4.25 and −1.75 degrees. In one form, the controller 114 compares the calibrated datum angle with the set angular range to determine if the calibrated datum angle is acceptable. If the calibrated datum angle is outside the set angular range, the controller 114 is configured to output a control signal to the sensor adjustment tool to have the tool 110 adjust the position of the radar assembly 108. For example, if the calibrated datum angle is greater than the upper limit of the set angular range, the controller 114 operates the sensor adjustment tool to decrease the datum angle by driving the fastener 204. The controller 114 may be configured in various suitable ways to adjust the position of the radar assembly 108. For example, the controller 114 incrementally adjusts the position by a set degree amount (e.g., increment of 0.001 degree). Alternatively, the controller 114 is configured to adjust the position based on the degree of error of the calibrated datum angle 116 relative to the angular threshold range, such that the sensor adjustment tool 110 adjusts the position to compensate for the degree error.

Figure 4:
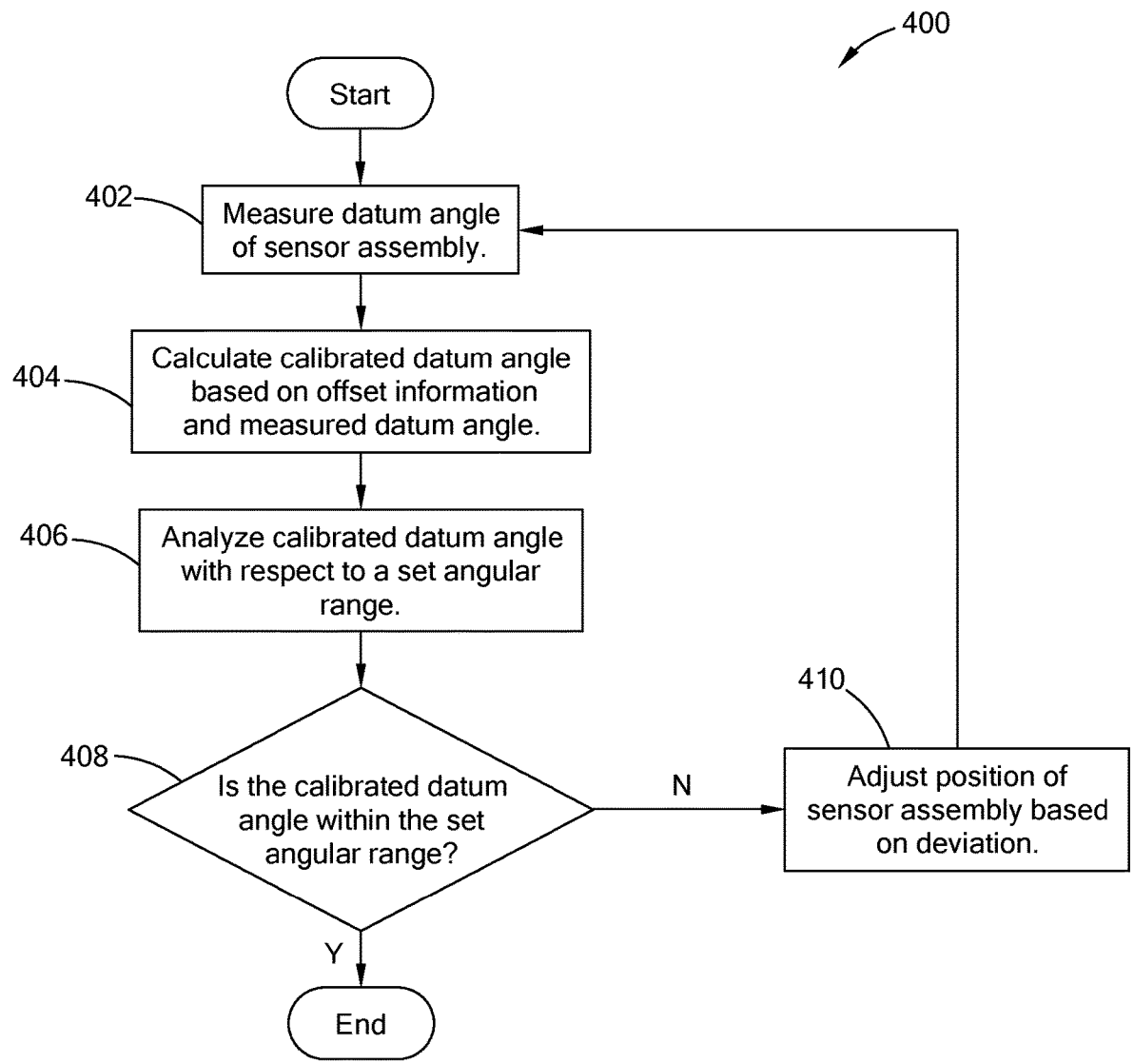
FIG. 4 is a flow diagram illustrating a method of aligning a sensor assembly according to principles of the present disclosure.

Referring to FIG. 4, an example flowchart of a sensor assembly alignment routine 400 performed by the system is provided. Prior to performing the routine 400, the operator positions the alignment gauge 112 on the sensor assembly and couples the sensor alignment tool to the fastener. At 402, the system measures the datum angle of the sensor assembly. In one form, the datum angle is measured by the alignment gauge and transmitted to the controller. Alternatively, the operator may read the datum angle from the display of the alignment gauge and input to the controller.

At 404, the system calculates a calibrated datum angle based on the offset information and the measured datum angle, and at 406 analyzes the calibrated datum angle with respect to a set angular range. At 408, the system determines whether the calibrated datum angle is within the set angular range. If the calibrated datum angle is within the set angular range, the routine 400 ends. Alternatively, if the calibrated datum is outside the set angular range, the system, at 410, adjusts the position of the sensor assembly. For example, the controller operates the sensor adjustment tool to drive the fastener in one of a first direction or a second direction based on the degree of error or in other words the deviation of the calibrated datum angle from the angular threshold range. Once, the adjustment is made, the system returns to 402 to measure the datum angle. By the closed-loop feedback process, the system adjusts the position until the calibrated datum angle is within the set angular range.

The sensor alignment system may be implemented as an inline manufacturing process or an offline manufacturing process. The system automates the alignment process of the sensor assembly to promote accurate and efficient alignment process with minimal operator error. In one form, by implementing the system as inline manufacturing process, separate workbenches are no longer required. Instead, the alignment system can be implemented as a stand-alone process or incorporated with another manufacturing step. In addition, the system considers various offsets that may affect the alignment of the sensor assembly, and thus, promotes accurate alignment.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A sensor alignment system for aligning a sensor assembly, the sensor assembly having a sensory face from which a measurement signal is transmitted, the sensor alignment system comprising:
    an alignment gauge operable to measure a datum angle of the sensor assembly, the alignment gauge having a datum surface that contacts the sensory face of the sensor assembly to measure the datum angle;
    a sensor adjustment tool operable to adjust a position of the sensor assembly relative to a vehicle body; and
    a controller communicably coupled to the alignment gauge and the sensor adjustment tool, wherein the controller is configured to operate the sensor adjustment tool to control the datum angle of the sensor assembly to within a tolerance range based on the datum angle measured by the alignment gauge and offset information, wherein the offset information is predefined and includes one or more recognized offsets that influence an angular position of the sensor assembly, and wherein the offset information includes an environmental offset that includes offsets related to a platform upon which the vehicle body is supported.

2. The system of claim 1, wherein the sensor assembly is a radar assembly and the alignment gauge includes a clamp that is operable to attach to the radar assembly as it measures the datum angle.

3. The system of claim 1, wherein the environmental offset includes offsets related to at least one of the sensor adjustment tool and the alignment gauge.

4. The system of claim 1, wherein the offset information further includes a statistical offset that is based on data of previously aligned sensor assemblies.

5. The system of claim 1, wherein the offset information further includes a sensor assembly offset that is based on offsets related to the sensor assembly.

6. The system of claim 1, wherein the controller is communicably coupled to the alignment gauge via wireless communication.

7. A method for aligning a sensor assembly disposed along a vehicle body, the method comprising:
measuring, by an alignment gauge, a datum angle of the sensor assembly, wherein the alignment gauge has a datum surface and is attached to the sensor assembly such that the datum surface interfaces with a sensory face of the sensor assembly from which a measurement signal from the sensor assembly is emitted;
calculating, by a controller, a calibrated datum angle based on the measured datum angle and offset information, wherein the offset information is stored by the controller and includes one or more recognized offsets that influence an angular position of the sensor assembly, wherein the offset information is predefined, and wherein the offset information includes an environmental offset and a statistical offset, wherein the environmental offset includes offsets related to a manufacturing environment of the vehicle body, and wherein the statistical offset is based on data of previously aligned sensor assemblies; and
adjusting a position of the sensor assembly with a sensor adjustment tool operable by the controller in response to the calibrated datum angle being outside an angular threshold range.

8. The method of claim 7 further comprising transmitting, by the alignment gauge via wireless communication, the measured datum angle to the controller.

9. The method of claim 7, wherein the adjusting the position of the sensor assembly further comprises:
transmitting, by the controller, a control signal to the sensor adjustment tool to have the sensor adjustment tool adjust the position of the sensor assembly based on the calibrated datum angle and the angular threshold range; and
driving, by the sensor adjustment tool, a fastener that attaches the sensor assembly to the vehicle body in response to receiving the control signal.

10. The method of claim 9 further comprising:
comparing, by the controller, the calibrated datum angle with the angular threshold range;
driving, by the sensor adjustment tool, the fastener in a first direction in response to the calibrated datum angle being greater than an upper limit of the angular threshold range; and
driving, by the sensor adjustment tool, the fastener in a second direction different from the first direction in response to the calibrated datum angle being less than a lower limit of the angular threshold range.

11. The method of claim 7, wherein the sensor assembly is a radar assembly.

12. The method of claim 7, wherein the environmental offset includes offsets related to at least one of the sensor adjustment tool, the alignment gauge, and a platform upon which the vehicle body is supported.

13. The method of claim 7, wherein the offset information includes a sensor assembly offset that is based on offsets related to the sensor assembly.

14. A method for aligning a vehicular radar assembly, the method comprising:
measuring, by an alignment gauge, a datum angle of the vehicular radar assembly;
transmitting, by the alignment gauge, the datum angle to a controller; and
adjusting, with a sensor adjustment tool operable by the controller, a position of the vehicular radar assembly based on the measured datum angle and offset information, such that the datum angle is within an angular threshold range, wherein:
the offset information is predefined and stored by the controller;
the offset information includes one or more recognized offsets that influence an angular position of the vehicular radar assembly;
the offset information includes an environmental offset and a sensor assembly offset;
the environmental offset includes offsets related to a manufacturing environment of the vehicular radar assembly; and
the sensor assembly offset is based on offsets related to the vehicular radar assembly.

15. The method of claim 14 further comprising:
calculating, by the controller, a calibrated datum angle based on the measured datum angle and the offset information; and
determining, by the controller, whether the calibrated datum angle is within the angular threshold range prior to adjusting the position of the vehicular radar assembly.

16. The method of claim 14, wherein the offset information includes a statistical offset that is based on data of previously aligned sensor assemblies.

* * * * *